(12) United States Patent
Fukuda et al.

(10) Patent No.: US 12,028,812 B2
(45) Date of Patent: Jul. 2, 2024

(54) METHOD AND SYSTEM FOR CONTROLLING TRANSMISSION POWER BETWEEN A BASE STATION AND A TERMINAL APPARATUS

(71) Applicant: KDDI CORPORATION, Tokyo (JP)

(72) Inventors: Hayato Fukuda, Tokyo (JP); Toshiaki Yamamoto, Tokyo (JP); Shigeo Terabe, Tokyo (JP); Motoki Hasegawa, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 560 days.

(21) Appl. No.: 17/128,889

(22) Filed: Dec. 21, 2020

(65) Prior Publication Data

US 2021/0112502 A1 Apr. 15, 2021

Related U.S. Application Data

(63) Continuation of application No. PCT/JP2019/027195, filed on Jul. 9, 2019.

(30) Foreign Application Priority Data

Jul. 11, 2018 (JP) ................. 2018-131804

(51) Int. Cl.
*H04W 52/14* (2009.01)
*H04W 24/10* (2009.01)
*H04W 52/24* (2009.01)

(52) U.S. Cl.
CPC ......... *H04W 52/146* (2013.01); *H04W 24/10* (2013.01); *H04W 52/241* (2013.01); *H04W 52/243* (2013.01)

(58) Field of Classification Search
CPC ... H04W 52/14; H04W 52/146; H04W 24/10; H04W 52/241; H04W 52/267; H04W 52/50; H04W 52/243; H04W 28/00; H04W 28/02; H04W 28/0273; H04W 47/365; H04W 28/10; H04W 52/00;
(Continued)

(56) References Cited

U.S. PATENT DOCUMENTS 6,463,295 B1 * 10/2002 Yun ............................... 455/522
6,961,362 B2 * 11/2005 Ariyoshi et al. ............. 375/130
(Continued)

FOREIGN PATENT DOCUMENTS

JP H08-008817 A 1/1996
JP 2004-064142 A 2/2004
(Continued)

OTHER PUBLICATIONS

Kim et al.: Method of Controlling Uplink Power in Wireless Communication System; WO 2010005236 A2 (Year: 2010).*
(Continued)

*Primary Examiner* — Meless N Zewdu
(74) *Attorney, Agent, or Firm* — Foley & Lardner LLP

(57) ABSTRACT

A base station apparatus determines whether or not, with respect to a connected terminal apparatus, a condition regarding interference to an up-link signal transmitted from the terminal apparatus to the base station apparatus is satisfied; and executes transmission power control using a first method with respect to the terminal apparatus that has been determined to satisfy the condition.

9 Claims, 3 Drawing Sheets

(58) Field of Classification Search
CPC . H04W 52/0258; H04W 52/08; H04W 52/04; H04W 52/06; H04W 52/125; H04W 52/143; H04W 52/32; H04W 52/322; H04W 52/325; H04W 52/327; H04W 52/34; H04W 52/367; H04W 52/60; H04W 52/365; H04W 52/30; H04W 52/26; H04W 52/18; H04W 52/221; H04W 72/541

See application file for complete search history.

(56) References Cited

U.S. PATENT DOCUMENTS

| | | | |
|---|---|---|---|
| 9,084,213 B2 * | 7/2015 | Wang et al. | H04W 52/54 |
| 9,674,792 B2 * | 6/2017 | Hu et al. | H04W 52/18 |
| 2004/0092233 A1 * | 5/2004 | Rudrapatna | 455/69 |
| 2004/0105406 A1 | 6/2004 | Kayama | |
| 2007/0093261 A1 | 4/2007 | Hou | |
| 2008/0159196 A1 * | 7/2008 | Roh et al. | 370/311 |
| 2008/0300004 A1 * | 12/2008 | Balachandran et al. | 455/522 |
| 2011/0009154 A1 | 1/2011 | Ishii | |
| 2011/0098076 A1 * | 4/2011 | Kim et al. | 455/522 |
| 2011/0222455 A1 * | 9/2011 | Hou et al. | 370/311 |
| 2012/0021798 A1 | 1/2012 | Ishii | |
| 2012/0243513 A1 * | 9/2012 | Fujishima et al. | 370/336 |
| 2013/0094433 A1 | 4/2013 | Nagata | |
| 2014/0274183 A1 * | 9/2014 | Zhu et al. | H04W 72/082 |
| 2016/0191375 A1 * | 6/2016 | Gopalakrishnan et al. | H04L 45/22 |
| 2017/0026914 A1 * | 1/2017 | Madan et al. | H04W 52/244 |
| 2019/0098639 A1 * | 3/2019 | Kubo et al. | H04W 72/085 |

FOREIGN PATENT DOCUMENTS

| | | |
|---|---|---|
| JP | 2009-513091 A | 3/2009 |
| JP | 2012-005015 A | 1/2012 |
| KR | 2824976 B1 * | 9/2017 ............ H04W 52/24 |
| WO | WO-2009/122783 A | 10/2009 |
| WO | WO-2010/084705 A | 7/2010 |
| WO | WO 2017032406 A1 * | 3/2017 ........... H04B 10/079 |

OTHER PUBLICATIONS

Brunel et al.: Method And Apparatus For Adjusting A Plurality Of The Transmit Power Of Signal Transmitted By Mobile Terminal Of; CN 103355006 B; (Year: 2017).*

Mizusawa et al.: Terminal Device, Communication Control Device, Radio Communication System, And Communication Control Method; CN 102917366 B (Year: 2018).*

Ryu et al.: Method and Device for Transmitting, By Terminal, Uplink Control Information in Communication System; WO 2017150925 A1 (Year: 2017).*

The present invention discloses a scheduling method and a system of a wireless client STA; CN 103533658 B (Year: 2019).*

Communication Terminal And Its Transmission Power Control Method; JP 5646193 B2. (Year: 2014).*

Gabor et al.: Uplink Transmission Power Control Method and Apparatus for Realising Said Method; RU 2520261 C1 (Year: 2014).*

Jitsukawa Daisuke: Wireless Communication System, Base Station, Terminal, and Processing Method; KR 20160127070 A (Year: 2016).*

Wu Huaming (WO 2013142040 A1) >>> Optimized Transmission of Machine Type Communication Data From a Mobile Device to a Wireless Network (see title) (Year: 2013).*

(TW 201625035 A) >>> Cell Selection For Devices With Asymmetry Between Uplink And Downlink Communications (see title; Description, particularly, paragraphs 3-4). (Year: 2016).*

* cited by examiner

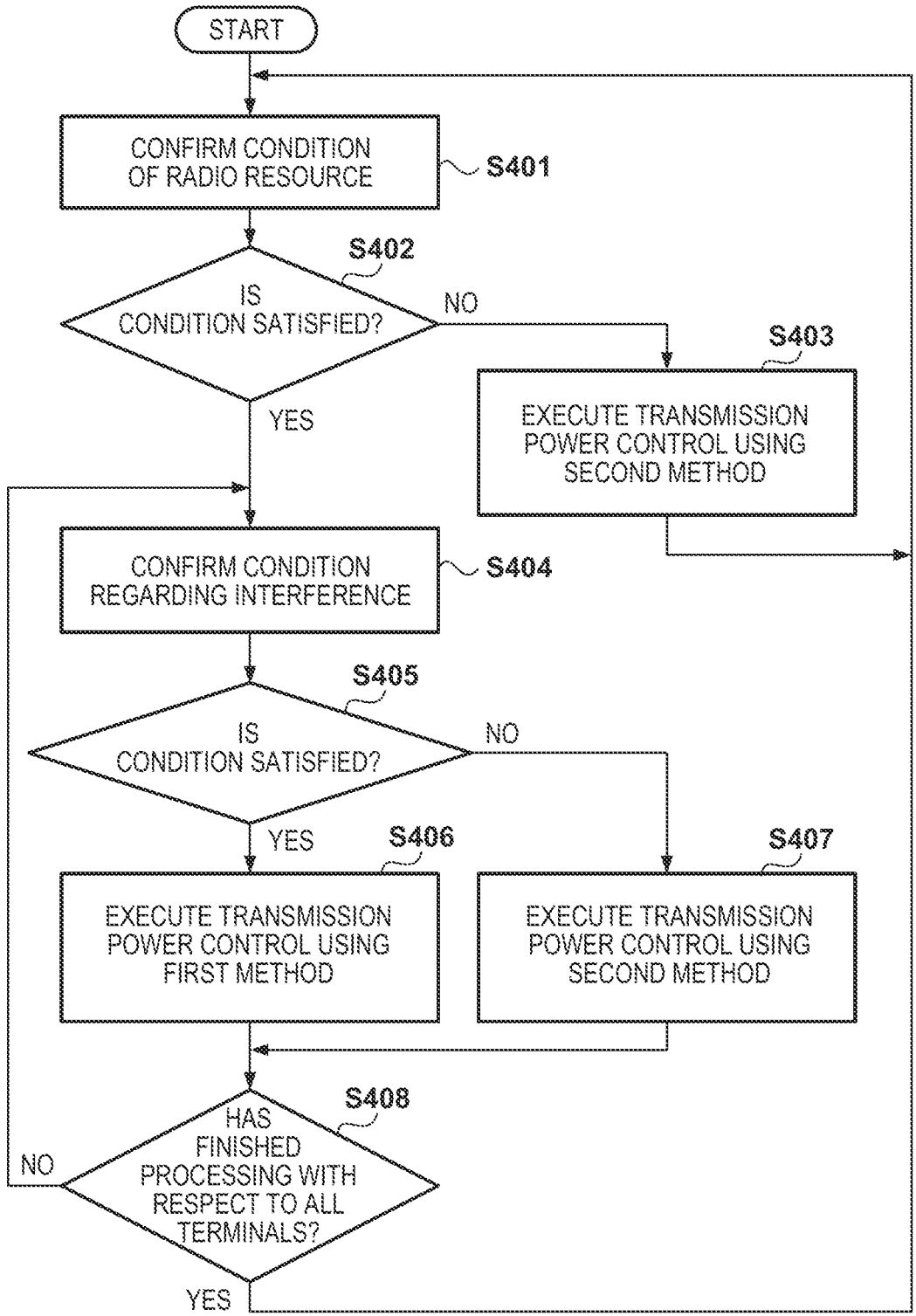

METHOD AND SYSTEM FOR CONTROLLING TRANSMISSION POWER BETWEEN A BASE STATION AND A TERMINAL APPARATUS

CROSS-REFERENCE TO RELATED APPLICATION(S)

This application is a continuation of International Patent Application No. PCT/JP2019/027195 filed on Jul. 9, 2019, which claims priority to and the benefit of Japanese Patent Application No. 2018-131804 filed on Jul. 11, 2018, the entire disclosures of which are incorporated herein by reference.

TECHNICAL FIELD

The present invention relates to a base station apparatus that controls transmission power of a terminal apparatus, a control method thereof, and a computer readable storage medium, and specifically relates to a transmission power control technique in the terminal apparatus.

BACKGROUND ART

In cellular communication such as Long Term Evolution (LTE), transmission power control of a terminal apparatus is generally performed in order to obtain sufficient communication quality, in an up-link direction of transmitting a signal from the terminal apparatus to a base station apparatus. The method of transmission power control includes a plurality of methods such as a method based on a signal-to-noise ratio (SNR) of an up-link signal from a terminal apparatus in a base station apparatus, and a method based on a signal-to-interference and noise ratio (SINR). A technique is described in PTL 1 in which the transmission power control is executed in accordance with the number of times of re-transmission of a signal.

CITATION LIST

Patent Literature
PTL 1: Japanese Patent Laid-Open No. 08-008817

SUMMARY OF THE INVENTION

Technical Problem

However, each power transmission method has a disadvantage while having an advantage relative to other methods. In contrast, because terminal apparatuses are placed in various environments, there may be a terminal apparatus in which the adopted transmission power control method appropriately operates, and a terminal apparatus in which the transmission power control method does not appropriately operate.

Solution to Problem

The present invention aims to provide a technique for enabling application of a transmission power control method suitable for each terminal apparatus.

A base station apparatus according to one aspect of the present invention performs: determining whether or not, with respect to a connected terminal apparatus, a condition regarding interference to an up-link signal transmitted from the terminal apparatus to the base station apparatus is satisfied; and executing transmission power control using a first method with respect to the terminal apparatus regarding which the condition has been determined to be satisfied.

Advantageous Effects of Invention

According to the present invention, a transmission power control method suitable for each terminal apparatus can be applied.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4 is a diagram illustrating an example of a flow of processing executed by the base station apparatus.

DESCRIPTION OF THE EMBODIMENTS

Figure 1:
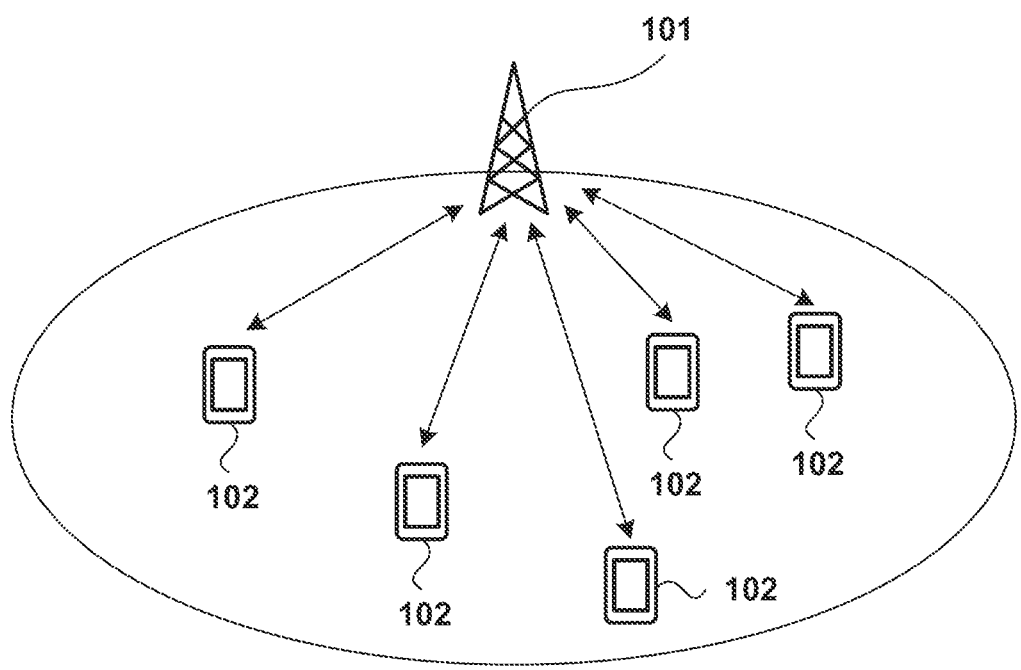
FIG. 1 is a diagram illustrating an exemplary configuration of a wireless communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(System Configuration)

FIG. 1 shows an exemplary configuration of a wireless communication system according to the present embodiment. This wireless communication system is an LTE (Long Term Evolution) system or a cellular communication system of the fifth generation or later, in one example. Note that, there is no limitation thereto, and the following discussion can also be applied to any wireless communication system that is similarly configured.

This wireless communication system is constituted by including at least one base station apparatus 101 and at least one terminal apparatus 102 that is to be connected to the base station apparatus 101. The base station apparatus 101 can further connect to a core network or another base station apparatus, and can relay communication between a terminal apparatus 102 and an apparatus such as a server on the network or another terminal apparatus. The base station apparatus 101 wirelessly transmits control information and user data in a down-link direction to a connected terminal apparatus 102, and a terminal apparatus 102 wirelessly transmits control information and user data in an up-link direction to the connected base station apparatus 101.

The base station apparatus 101 can appropriately set the up-link communication quality of each terminal apparatus 102 by controlling the transmission power when the terminal apparatus 102 transmits an up-link signal. For example, the base station apparatus 101 may perform control such that the radio quality of a plurality of terminal apparatuses 102 is maximized. Note that, when the transmission power of a terminal apparatus 102 is increased by the transmission power control, although the radio quality of the terminal apparatus 102 is improved, the up-link communication of a cell adjacent thereto may be interfered. Therefore, it is important to perform power control such that power with which a needed radio quality can be obtained is to be used without entering an excessive range. Also, the base station apparatus 101 may perform control such that the sum of throughput values that can be respectively obtained in the plurality of terminal apparatuses 102 is maximized. Also, the base station apparatus 101 may perform control such that each terminal apparatus 102 transmits a signal with a minimum transmission power with which the requested radio quality or requested throughput is obtained.

The method of power control includes a plurality of methods such as a method based on a signal-to-noise ratio (SNR) or a signal-to-interference and noise ratio (SINR) of an up-link signal from a terminal apparatus 102 in the base station apparatus 101, and a method based on a number of times of re-transmission of a signal, for example. In general, one power control method is adopted in a system, and the transmission power of each terminal apparatus 102 connected to one base station apparatus 101 is controlled by the same method. On the other hand, the power control method suitable for a terminal apparatus 102 may be different depending on a situation in which the terminal apparatus 102 is placed. Therefore, in the present embodiment, the base station apparatus 101 determines the transmission power control method for each connected terminal apparatus 102.

Specifically, the base station apparatus 101 according to the present embodiment determines, for each of the connected terminal apparatuses 102, whether or not a condition regarding interference to an up-link signal transmitted from the terminal apparatus 102 is satisfied, and determines the transmission power control method to be used based on the detetinination result. For example, the base station apparatus 101 executes transmission power control with a first method having a high interference resistance performance with respect to a terminal apparatus 102 that is determined to satisfy the condition. This condition may be a condition that the communication quality is envisioned to be deteriorated due to the interference, for example.

The first method is a method of controlling the transmission power of a terminal apparatus 102 based on a number of times of successively succeeding or failing in transmission of up-link signals that have been transmitted by the terminal apparatus 102, for example. That is, in the first method, the transmission power is increased by a fixed amount (e.g., 1 dB or 3 dB) when the number of times of re-transmission of HARQ (hybrid automatic repeat-request) or RLC (radio link control) in PUSCH (Physical Uplink Shared Channel) or PUCCH (Physical Uplink Control Channel) reaches a first predetermined number, for example. In this way, as a result of increasing the transmission power of a terminal apparatus 102 regarding which the communication quality is envisioned to be deteriorated due to interference, and the number of times of re-transmission is large, the communication quality of the terminal apparatus 102 can be improved. Note that when the number of times of re-transmission (number of successive failures in transmission) reaches a predetermined number even if the transmission power has been increased, transmission power is further increased. On the other hand, in the first method, if a terminal apparatus 102 has successively succeeded a second predetermined number of times in transmission of PUSCH or PUCCH in the first transmission of HARQ or RLC, the transmission power of the terminal apparatus 102 is decreased by a fixed amount (e.g., 1 dB or 3 dB), for example. Accordingly, the transmission power of a terminal apparatus 102 whose communication quality is considered to be sufficiently high is decreased, and the interference to other terminal apparatuses 102 can be reduced. Note that, if the transmission has successively succeeded a predetermined number of times in the first transmission even if the transmission power was decreased, the transmission power may be decreased. Note that the processing described above is merely an example, and another processing may be executed such as processing in which when the re-transmission probability exceeds a first predetermined probability, the transmission power is increased, and when the first transmission success probability exceeds a second predetermined probability, the transmission power is decreased, for example.

Note that the first predetermined number of times and the second predetermined number of times may be values that can be set. That is, the base station apparatus 101 may set the first predetermined number of times and the second predetermined number of times in accordance with the situation and the attribute of a terminal apparatus 102 to which the first method is applied. For example, the first predetermined number of times may be set to a large number such that the interference will not quickly increase when the utilization rate of radio resources is higher than a certain value, and the second predetermined number of times may be set to a small number such that the transmission power of a signal that is to be an interference source is decreased as soon as possible. Also, for example, the base station apparatus 101 may prioritize the terminal apparatuses 102, and the first predetermined number of times described above may be set to a small value such that the transmission power increases as soon as possible with respect to a terminal apparatus 102 whose priority is high. On the other hand, the base station apparatus 101 may set the first predetermined number of times to a large value with respect to a terminal apparatus 102 whose priority is low such that the speed of increasing the transmission power is not too high. Also, the base station apparatus 101 may set the second predetermined number of times to a small value with respect to a terminal apparatus 102 whose priority is high, and may set the second predetermined number of times to a large value with respect to a terminal apparatus 102 whose priority is low.

The condition regarding interference with respect to a terminal apparatus 102 includes a condition that the up-link signal-to-interference and noise ratio (SINR) of a signal transmitted from the terminal apparatus 102 does not exceed a first predetermined value, for example. That is, the configuration may be such that the first method is used with respect to a terminal apparatus 102 whose SINR is sufficiently low and that is strongly influenced by interference, but the first method is not used when the SINR is the first predetermined value or more. For example, if the SINR reaches the first predetermined value or more as a result of having successively increased the transmission power using the first method with respect to a terminal apparatus 102, the transmission power control with the first method is stopped with respect to the terminal apparatus 102, and the transmission power control is performed with a second method that is different from the first method. With this, the case can be prevented from occurring in which, in spite of the transmission power of a terminal apparatus 102 being sufficiently large relative to the interference power, the transmission power of the terminal apparatus 102 is successively increased to an excessive value. Note that the first predetermined value may be an SINR value with which minimum communication can be envisioned to be executed. Also, the condition regarding interference with respect to a terminal apparatus 102 includes a condition that the interference power to an up-link signal transmitted from the terminal apparatus 102 exceeds a second predetermined value, for example. That is, the transmission power control may be executed with the first method described above with respect to a terminal apparatus 102 that is strongly influenced by interference, but the first method is not used in the transmission power control with respect to a terminal apparatus 102 that is known to be not strongly influenced by interference. in this way, as a result of executing the transmission power control with the first method in which the influence of interference is considered with the number of times of re-transmission or the like, with respect to a terminal apparatus 102 that is strongly influenced by interference, the probability of occurrence of re-transmission due to being influenced by interference can be reduced. On the other hand, when the SINR is sufficiently high, or with respect to a terminal apparatus 102 whose interference power is low, because a transmission power control method in which the interference is considered need not be used, the second method that is different from the first method may be used.

Note that the base station apparatus 101 may, when determining the transmission power control method based on a plurality of conditions regarding interference as described above, use the first method with respect to a terminal apparatus 102 in which all of the plurality of conditions are satisfied, and use the second method with respect to a terminal apparatus 102 in which any of the plurality of conditions is not satisfied.

Also, the base station apparatus 101 may further determine whether or not a terminal apparatus satisfies a second condition regarding a usage situation of radio resources, and execute the transmission power control using the first method with respect to a terminal apparatus 102 that satisfies the condition regarding the interference described above, in an environment in which the second condition is satisfied. The second condition includes at least any of a condition that the number of terminal apparatuses 102 that are connected to the base station apparatus 101 does not exceed a predetermined number, a condition that the utilization rate of an up-link resource block in the base station apparatus 101 does not exceed a third predetermined value, and a condition that the utilization rate of Control Channel Element (CCE) does not exceed a fourth predetermined value. When this second condition is not satisfied, because the utilization rate of radio resources is high, it is possible that the interference to another adjacent base station apparatus increases due to the increase in power caused by performing the transmission power control with the first method. Therefore, when the second condition is not satisfied, the first method may not be used with respect to any of the terminal apparatuses 102. Note that, in the above-description, an example has been described in which whether or not the first method will be used with respect to a terminal apparatus 102 connected to the base station apparatus 101 is determined based on the usage situation of radio resources in the base station apparatus 101, but there is no limitation thereto. The base station apparatus 101 may perform determination of the second condition in accordance with the usage situation of radio resources with respect to each of the terminal apparatuses 102. For example, it may be determined that, if the usage amount of radio resources such as the amount of resource blocks assigned to the terminal apparatus 102 is a predetermined amount or more, the first method will not be used.

Note that the base station apparatus 101 may not use the first method with respect to a terminal apparatus 102 whose transmission power is a fifth predetermined value or more, for example. This is because, if the transmission power is increased using the first method with respect to a terminal apparatus 102 whose transmission power is sufficiently high, the probability that the signal transmitted from the terminal apparatus 102 becomes an interference source increases. Therefore, the second method is adopted as the transmission power control method with respect to this terminal apparatus 102 such that the transmission power of such a terminal apparatus 102 will not be too large.

As described above, the base station apparatus 101 executes the transmission power control of a terminal apparatus that satisfies the condition regarding interference (that satisfies the second condition in addition to this condition depending on the case) using the first method. In contrast, the base station apparatus 101 may perform the transmission power control using the second method that is different from the first method with respect to another terminal apparatus 102 regarding which the first method is not used. Here, the second method is a method in which the transmission power of the terminal apparatus 102 is controlled based on the received power when the up-link is measured in the base station apparatus 101, for example. In this way, for example, as a result of using the second method when the influence of interference is not strong, or the utilization rate of radio resources is high, the case can be prevented from occurring in which one of two or more terminal apparatuses 102 increases the transmission power, with this, the interference to the other terminal apparatus increases, and therefore the other terminal apparatus further increases the transmission power due to the influence of interference, and this operation continues.

In the following, the configuration of the base station apparatus that executes the above-described processing and the flow of processing to be executed will be described.

(Hardware Configuration)

Figure 2:
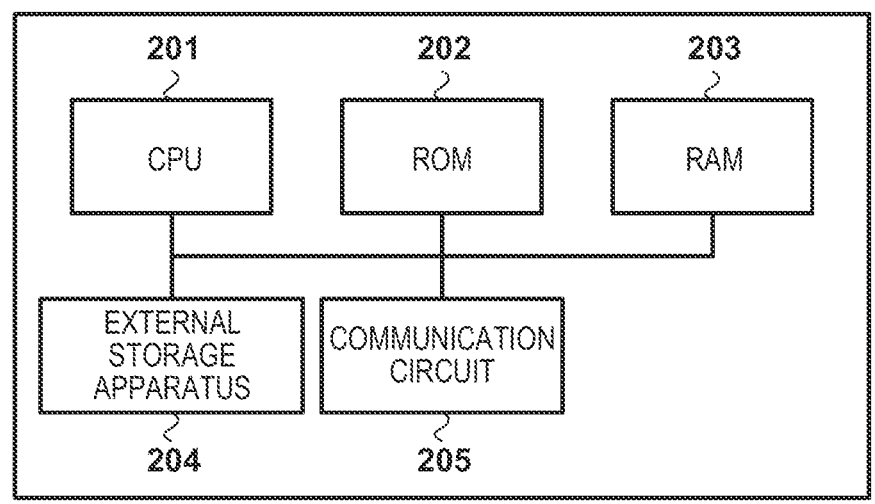
FIG. 2 is a diagram illustrating an exemplary configuration of a base station apparatus.

FIG. 2 shows an exemplary hardware configuration of the base station apparatus 101. The base station apparatus 101 has, in one example, a hardware configuration as shown in FIG. 2, and include a CPU 201, a ROM 202, a RAM 203, an external storage apparatus 204, and a communication circuit 205, for example. In the base station apparatus 101, programs for realizing the functions of the base station apparatus 101 that are recorded in one of the ROM 202, the RAM 203, and the external storage apparatus 204 are executed by the CPU 201.

Also, the base station apparatus 101 performs communication with another apparatus by the CPU 201 controlling the communication circuit 205, for example. Note that the communication circuit 205 of the base station apparatus 101 can perform communication with another base station apparatus or another network node through a wire circuit, for example. Also, the communication circuit 205 of the base station apparatus 101 may be able to perform wireless communication with a terminal apparatus 102 by forming one or more (a plurality of) beams. Note that, in the configuration shown in FIG. 2, a schematic diagram is illustrated in which the base station apparatus 101 includes one communication circuit 205, but there is no limitation thereto, and may include a plurality of communication circuits. For example, the base station apparatus 101 may include a first communication circuit for wired communication with another base station apparatus and a second communication circuit for wireless communication with a terminal apparatus 102.

Note that, the base station apparatus 101 may include dedicated hardware for executing the functions, or may execute some functions by hardware, and execute other functions by a computer executing a program. Also, all of the functions may be executed by a computer and a program. Also, such a program may be stored in a storage medium such as a hard disk or a silicon drive.

(Functional Configuration)

Figure 3:
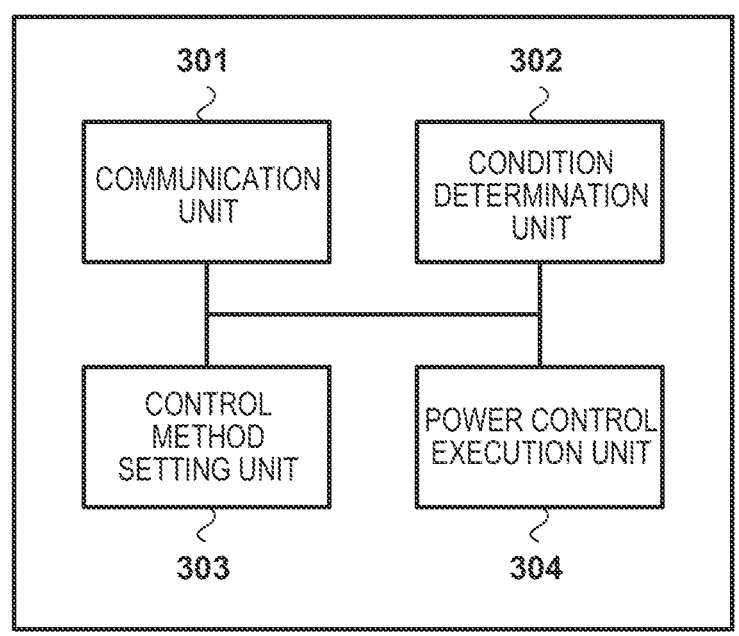
FIG. 3 is a diagram illustrating an exemplary functional configuration of the base station apparatus.

FIG. 3 shows an exemplary functional configuration of the base station apparatus 101. The base station apparatus 101 includes a communication unit 301, a condition determination unit 302, a control method setting unit 303, and a power control execution unit 304, for example.

The communication unit 301 executes wireless communication with a connected terminal apparatus 102. The condition determination unit 302 determines, with respect to each terminal apparatus 102, whether or not the first condition regarding the interference to an up-link signal transmitted from the aforementioned terminal apparatus 102 is satisfied. Also, the condition determination unit 302 may determine whether or not the second condition regarding the usage situation of radio resources is satisfied in addition thereto, depending on the case. That is, the condition determination unit 302 performs determination for specifying a terminal apparatus 102 in a state in which interference is strong, in a state of the utilization rate of radio resources being less than a predetermined degree, for example. The control method setting unit 303 sets a transmission power control method to be used for each terminal apparatus 102 based on the determination result of the condition determination unit 302. The power control execution unit 304 executes the transmission power control for each terminal apparatus 102 with a method set by the control method setting unit 303.

With this, transmission power control using the first method in which the influence of interference is considered can be executed with respect to a terminal apparatus 102 that is strongly influenced by interference, and transmission power control using the second method in which the influence of interference is not considered can be executed with respect to a terminal apparatus 102 that is weakly influenced by interference. Also, a configuration may be adopted in which, in the case where it is envisioned that the utilization rate of radio resources is high, and when transmission power control is performed using the first method in which interference is considered, the influence of interference to another base station apparatus increases, the first method will not be used. Also, with respect to a terminal apparatus 102 whose transmission power is sufficiently high, even in a case where the up-link signal transmitted from the terminal apparatus 102 is strongly influenced by interference, the first method will not be used, and as a result, the interference to another communication due to the up-link signal can be suppressed.

(Processing Flow)

Next, an example of the flow of processing executed by the base station apparatus 101 will be described. FIG. 4 is a flowchart illustrating an example of a flow of processing executed by the base station apparatus 101. The base station apparatus 101 continues to execute the processing in FIG. 4 while at least one terminal apparatus 102 is connected, for example. First, the base station apparatus 101 confirms whether or not a condition (second condition described above) regarding the usage situation of radio resources is satisfied (step S401), for example. The base station apparatus 101 confirms that the number of terminal apparatuses 102 connected to the base station apparatus 101 does not exceed a predetermined number, the utilization rate of up-link resource blocks in the base station apparatus 101 does not exceed a third predetermined value, and the utilization rate of the CCE does not exceed a fourth predetermined value, for example. The base station apparatus 101, if the second condition is not satisfied (NO in step S402), determines to perform transmission power control using the second method with respect to all of the terminal apparatuses 102 regardless of whether or not the condition regarding interference in each terminal apparatus 102 is satisfied (step S403), and returns the processing to step S401. Note that the base station apparatus 101 may determine, when a plurality of second conditions are set, whether or not all of the conditions are satisfied. That is, the base station apparatus 101 may, if any of the plurality of conditions is not satisfied (e.g., a case where the number of terminal apparatuses 102 connected to the base station apparatus 101 is a predetermined number or more), determine that the second condition is not satisfied. The second method is a method of controlling the transmission power of a terminal apparatus 102 (without considering interference) based on the received power when an up-link was measured in the base station apparatus 101, as described above. In this case, the base station apparatus 101 does not use the first method until a state is achieved in which the second condition is satisfied. Here, the first method is a method in which the transmission power of a terminal apparatus 102 is controlled based on the number of times of successively succeeding or failing in transmission of an up-link signal transmitted from the terminal apparatus 102, as described above, for example. Note that the processing in steps S401 to S403 may not be performed. That is, only the processing in steps S404 to S408, which will be described later, may be executed.

On the other hand, the base station apparatus 101, upon confirming that the second condition is satisfied (that is, in a state in which the utilization rate of radio resources is low) (YES in step S402), confirms whether or not the condition regarding the interference to an up-link signal (PUSCH/PUCCH) transmitted from each terminal apparatus 102 is satisfied (step S404). The base station apparatus 101 may confirm that the signal-to-interference and noise ratio (SINR) of an up-link signal transmitted from the terminal apparatus 102 does not exceed the first predetermined value, and that the interference power to an up-link signal transmitted from the terminal apparatus 102 exceeds the second predetermined value, for example. The base station apparatus 101, upon determining that the condition regarding interference is satisfied with respect to a terminal apparatus 102 (YES in step S405), determines to execute the transmission power control using the first method with respect to the terminal apparatus 102 (step S406). That is, the first method in which the interference is considered is used with respect to a terminal apparatus 102 in a state in which the influence of interference is strong. On the other hand, the base station apparatus 101, upon determining that the condition regarding interference is not satisfied with respect to a terminal apparatus 102 (NO in step S405), determines to execute the transmission power control using the second method with respect to the terminal apparatus 102 (step S407). That is, the second method in which the interference is not considered is used with respect to a terminal apparatus 102 in a state in which the influence of interference is not strong. The base station apparatus 101 executes the processing in steps S404 to S407 separately with respect to all of the connected terminal apparatuses 102, and separately determines the transmission power control method to be used to each of all of the terminal apparatus 102 (step S408).

As described above, the base station apparatus 101 can separately set appropriate transmission power control methods to respective connected terminal apparatuses 102 in accordance with respective situations, and as a result, transmission power suitable for each terminal apparatus 102 can be obtained.

The present invention is not limited to the above embodiment and various changes and modifications can be made within the spirit and scope of the present invention. Therefore, to apprise the public of the scope of the present invention, the following claims are made.

The invention claimed is:

1. A base station apparatus performing a method of:
    determining whether or not, with respect to a connected terminal apparatus, a condition regarding interference to an up-link signal transmitted from the terminal apparatus to the base station apparatus is satisfied; and
    executing transmission power control using a first method with respect to the terminal apparatus that has been determined to satisfy the condition,
    wherein executing the transmission power control includes storing a predetermined threshold value and increasing transmission power of the up-link signal of the terminal apparatus responsive to a number of times of failing in transmission of the up-link signal reaching the predetermined threshold value,
    wherein executing the transmission power control includes executing transmission power control using a second method with respect to another terminal apparatus regarding which transmission power control using the first method is not executed.

2. The base station apparatus according to claim 1, wherein the condition includes a condition that a signal-to-interference and noise ratio (SINR) of the up-link signal does not exceed a first predetermined value.

3. The base station apparatus according to claim 1, wherein the condition includes a condition that the power of the interference to the up-link signal exceeds a second predetermined value.

4. The base station apparatus according to claim 1,
    wherein the determining includes determining whether or not a second condition regarding a usage situation of radio resources is satisfied, and
    the executing includes executing transmission power control using the first method with respect to the terminal apparatus that satisfies the condition and the second condition.

5. The base station apparatus according to claim 4, wherein the second condition includes at least any of a condition that the number of the terminal apparatuses connected to the base station apparatus does not exceed a predetermined number, a condition that the utilization rate of resource blocks of the up-link does not exceed a third predetermined value, and a condition that the utilization rate of a Control Channel Element (CCE) does not exceed a fourth predetermined value.

6. The base station apparatus according to claim 1, wherein the first method is a method of controlling transmission power of the up-link signal of the terminal apparatus based on a number of times of successively succeeding.

7. The base station apparatus according to claim 1, wherein the second method is a method of controlling transmission power of the up-link signal of the other terminal apparatus based on received power when the up-link signal has been measured in the base station apparatus.

8. A control method of a base station apparatus, the control method comprising:
    determining, whether or not, with respect to a connected terminal apparatus, a condition regarding interference to an up-link signal transmitted from the terminal apparatus to the base station apparatus is satisfied; and
    executing, transmission power control using a first method with respect to the terminal apparatus that has been determined to satisfy the condition,
    wherein executing the transmission power control includes storing a predetermined threshold value and increasing transmission power of the up-link signal of the terminal apparatus responsive to a number of times of failing in transmission of the up-link signal reaching the predetermined threshold value,
    wherein executing the transmission power control includes executing transmission power control using a second method with respect to another terminal apparatus regarding which transmission power control using the first method is not executed.

9. A non-transitory computer readable storage medium storing a program for causing a computer included in a base station apparatus to execute steps of:
    determining whether or not, with respect to a connected terminal apparatus, a condition regarding interference to an up-link signal transmitted from the terminal apparatus to the base station apparatus is satisfied; and
    executing transmission power control using a first method with respect to the terminal apparatus that has been determined to satisfy the condition,
    wherein executing the transmission power control includes storing a predetermined threshold value and increasing transmission power of the up-link signal of the terminal apparatus responsive to a number of times of failing in transmission of the up-link signal reaching the predetermined threshold value,
    wherein executing the transmission power control includes executing transmission power control using a second method with respect to another terminal apparatus regarding which transmission power control using the first method is not executed.

* * * * *